(12) United States Patent
Linjama et al.

(10) Patent No.: US 7,145,454 B2
(45) Date of Patent: Dec. 5, 2006

(54) METHOD, APPARATUS AND COMPUTER PROGRAM PRODUCT FOR INTUITIVE ENERGY MANAGEMENT OF A SHORT-RANGE COMMUNICATION TRANSCEIVER ASSOCIATED WITH A MOBILE TERMINAL

(75) Inventors: Jukka Linjama, Espoo (FI); Janne Jalkanen, Espoo (FI)

(73) Assignee: Nokia Corporation, Espoo (FI)

( * ) Notice: Subject to any disclaimer, the term of this patent is extended or adjusted under 35 U.S.C. 154(b) by 193 days.

(21) Appl. No.: 10/765,337

(22) Filed: Jan. 26, 2004

(65) Prior Publication Data

US 2005/0164633 A1   Jul. 28, 2005

(51) Int. Cl.
G08B 21/00 (2006.01)

(52) U.S. Cl. .............. 340/540; 340/572.1; 340/545.5; 200/61.45 R; 335/205; 455/41.2; 455/127.1; 455/574

(58) Field of Classification Search ............. 340/545.5, 340/572.1, 568.1, 571; 200/61.45 R, 61.46, 200/61.52; 73/652; 335/205, 206, 207; 455/41.2, 41.3, 343.1, 574, 127.1, 127.5
See application file for complete search history.

(56) References Cited

U.S. PATENT DOCUMENTS

| | | | | |
|---|---|---|---|---|
| 5,305,008 A * | 4/1994 | Turner et al. | .................. | 342/44 |
| 5,963,131 A * | 10/1999 | D'Angelo et al. | ........ | 340/568.1 |
| 6,300,933 B1 * | 10/2001 | Nagasaki et al. | ........... | 345/685 |
| 6,549,792 B1 * | 4/2003 | Cannon et al. | .......... | 455/550.1 |
| 6,677,852 B1 * | 1/2004 | Landt | ......................... | 340/10.1 |
| 2003/0085870 A1 * | 5/2003 | Hinckley | ..................... | 345/156 |
| 2003/0100295 A1 * | 5/2003 | Sakai et al. | ................. | 455/415 |
| 2003/0134657 A1 | 7/2003 | Norta et al. | | |
| 2004/0102159 A1 * | 5/2004 | Suda et al. | ............... | 455/67.11 |
| 2004/0145564 A1 * | 7/2004 | Duarte et al. | ............... | 345/156 |
| 2004/0169674 A1 * | 9/2004 | Linjama | .................... | 345/702 |
| 2004/0181703 A1 * | 9/2004 | Lilja et al. | .................. | 713/324 |
| 2005/0083181 A1 * | 4/2005 | Jalkanen et al. | ......... | 340/10.34 |

FOREIGN PATENT DOCUMENTS

| | | |
|---|---|---|
| EP | 0 833 537 A3 | 4/1998 |
| EP | 1101697 A2 | 5/2001 |
| EP | 1104143 A2 | 5/2001 |
| WO | WO 97/22079 | 6/1997 |
| WO | WO 03/098851 A1 | 11/2003 |

* cited by examiner

Primary Examiner—Jeffery Hofsass
Assistant Examiner—Samuel J Walk
(74) Attorney, Agent, or Firm—Alston & Bird LLP

(57) ABSTRACT

The method, terminal and computer program product determine the acceleration of a mobile terminal associated with the short-range communication transceiver and adjusts the power consumption of the short-range communication transceiver based upon whether a predefined acceleration threshold has been exceeded. To adjust the power consumption, the frequency at which the transceiver is activated may be altered. Thus, the power consumption of the transceiver may be reduced when the acceleration threshold is exceeded and/or may be increased when the acceleration threshold is not exceeded. Due to the adjustment of power consumption by transceivers, power is conserved in the mobile terminals associated with transceivers, which permits the mobile terminals and the transceivers to operate longer without requiring charging or replacement of the power supply.

38 Claims, 5 Drawing Sheets

METHOD, APPARATUS AND COMPUTER PROGRAM PRODUCT FOR INTUITIVE ENERGY MANAGEMENT OF A SHORT-RANGE COMMUNICATION TRANSCEIVER ASSOCIATED WITH A MOBILE TERMINAL

FIELD OF THE INVENTION

This invention relates to the energy management of battery-powered devices, and more particularly, relates to the optimization of power consumption by short-range communication transceiver, such as radio frequency identification (RFID), associated with a mobile terminal.

BACKGROUND OF THE INVENTION

Short-range communication transceivers are become more prominent in a wide variety of mobile digital devices, such as cellular phones, personal digital assistants, pagers and other mobile devices. The short-range communication transceivers provide the devices with the ability to communicate via RFID, Bluetooth®, infrared or other types of short-range communication dependent upon the type of transceiver associated with the mobile device. Continuous active operation of short-range communication transceivers, however, consumes significant amounts of power. Therefore, in a typical mobile device with short-range communication capabilities the device is prone to require a larger power supply and/or more frequent charging of the power supply, as compared to the mobile device that is not equipped to communicate via a short-range communication medium. Both larger power supplies and more frequent power supply charging are not viable alternatives in the mobile environment. Larger power supplies lead to larger mobile devices, which is counter-intuitive to the general mobile concept that "smaller is better" or at least more practical. In the same regard, frequent charging of the mobile device power supply is inconvenient for the user and reduces the lifetime expectancy of the power supply.

For example, a typical low frequency RFID reader runs on a 3 Hz scan cycle; meaning that it is activated, i.e., "wakes up", once every 330 ms to check for transponders in the general vicinity. With current technology, this type of repetitive activation can add up to upwards of 20 percent of the power consumed by the mobile device. However, in the vast majority of instances the wake-up period results in no transponders being available, so that the power that is consumed is unwarranted.

As such, there is a need in the industry to conserve the power in mobile devices associated with short-range communication transceivers to permit utilization of conventional power supplies and typical power supply charging schedules for the mobile devices. Various attempts have been made to address power management in mobile devices and particularly those devices that are associated with short-range communication transceivers.

One type of power-conserving method has been implemented for RFID short-range communication. The method involves limiting the "reading" of the identification RFID transponder, (also referred to as the tag) to only a portion of the transponder/tag, and if the RFID reader identifies that it has previously read the tag based upon the identification portion, the RFID reader does not read the rest of the tag. While this power-conserving method is helpful, the RFID reader still consumes more power than desired and the method does not address the problem of continual active operation.

In another recently developed power conservation method, an appropriate sensor measures the movement of the mobile device and active read operations continue while the movement of the device is unknown. When the movement of the device is identified, however, one or more of the subunits of the device is changed from an active operation mode to a sleep operation mode, where the sleep operation mode consumes less power than the active operation mode. The device then stays in the sleep operation mode while the movement of the device is known, then changes back to the active operation mode when the movement of the device becomes unknown. Again, while this power-conserving method is helpful, the device still consumes more power than desired because the device is in an active operation mode anytime the movement is unknown, which amounts to most of the time that the device is in use due to the "mobile" nature of the device.

Thus, there is a need for techniques that permit greater conservation of power in mobile devices associated with a short-range communication transceiver so that the mobile device does not need a larger power supply or frequent power supply charging. In addition the preferred method should provide for intuitive use and clear user control, thereby eliminating the likelihood of the transceiver being activated in unwarranted situations.

BRIEF SUMMARY OF THE INVENTION

The present invention provides techniques for greater conservation of power in mobile devices associated with RFID readers, such that the mobile device does not need a larger power supply or as frequent charging of the power supply as mobile devices that do not utilize the techniques of the present invention. In particular, the techniques for power conservation of the present invention utilize the existing abilities of a mobile device to provide information regarding the context of the mobile device to optimize the power-consumption of a RFID reader associated with the mobile device.

One embodiment of the invention is defined by a mobile terminal apparatus. The mobile terminal will typically be a cellular telephone device, which may include other devices or the mobile terminal may be any other mobile device, such as a personal data assistant (PDA), pager, laptop computer or the like. Alternatively, the mobile terminal may be a secondary mobile terminal, such as a key-ring appendage or fob that is in wireless communication with the primary mobile terminal; i.e., the cellular telephone device, PDA or the like. The mobile terminal will include a short-range communication transceiver, such as Radio Frequency Identification (RFID), Bluetooth®, or Infrared (IR) transceiver or the like. Additionally, the mobile terminal will include a motion sensor, such as an acceleration sensor. The acceleration sensor will measure the acceleration of the mobile terminal as a means of determining if the transceiver should be activated or if the frequency upon which the transceiver is activated should be changed. In this regard, the mobile terminal is configured such that intentional gestures, such as "tapping" the device, "shaking" the device or otherwise moving the device will trigger activation of the transceiver or a change in the frequency of the activation scheme. Additionally, the mobile terminal may be configured with a means for alerting the device user that the intentional gesture was successful; i.e., the intentional gesture triggered activation of the transceiver. The means for alerting may include tactile (vibration pulse) feedback, audio feedback, visual feedback or the like.

In order to implement this process, the mobile terminal is also equipped with a processor that is in communication with the sensor and the transceiver. The processor determines if the acceleration of the mobile terminal exceeds a predefined threshold and provides a transceiver-controlling input to the transceiver upon determination of an acceleration exceeding the predefined. The transceiver-controlling input may include a transceiver activation input or a transceiver frequency change input. Additionally, the motion sensor may be implemented in conjunction with the processor in a single unitary device or it may be implemented as a stand-alone device, such as a key-ring appendage or fob. It is also possible to configure the sensor with appropriate activation/deactivation logic that may change the operational mode of the sensor based upon the intentional user gesture exceeding a predetermined threshold.

The invention may also be defined by a system for providing a mobile terminal short-range wireless communication. The system includes a primary mobile terminal, such as cellular telephone, PDA, portable computer, digital camera or the like, and a secondary mobile terminal such as a key-ring appendage, a fob or the like. The secondary mobile terminal includes a Radio Frequency Identification (RFID) reader, an acceleration sensor in communication with the reader that detects acceleration of the mobile terminal, and a processor in communication with the sensor and the reader that determines if the acceleration of the secondary mobile terminal exceeds a predefined threshold and provides activation to the reader upon determination of an acceleration exceeding the predefined threshold. Additionally, the secondary mobile terminal will include a short-range wireless communication module, such as a Bluetooth or WLAN module that provides for communication of information read by the RFID reader. The primary mobile terminal will include a short-range communication module that is associated with the short-range communication module of the secondary mobile terminal, such that information read by the RFID reader of the secondary mobile terminal is communicated to the primary mobile terminal.

The invention is also defined by a method for activating a short-range communication transceiver associated with a mobile terminal. The method includes the steps of detecting motion of a mobile terminal, determining a rate of motion provided to the mobile terminal and activating the transceiver associated with the mobile terminal if the rate of motion exceeds a predefined threshold. As discussed in relation to the apparatus aspect of the invention, detecting motion of the terminal will typically come in the form of an intentional user gesture. Such intentional gesturing will insure that the transceiver is only activated in situations and environments in which the user deems necessary. In addition, the method may comprise the step of determining a frequency of transceiver activation based upon the determined rate of acceleration. In this regard, motion to the device may be associated with more or less periods of transceiver activation. Also, the method may include the step of deactivating the transceiver after a predefined time period.

Additionally, the invention is defined by a method for adjusting power consumption of a short-range communication transceiver associated with a mobile terminal. The method includes the steps of determining an acceleration rate of the mobile terminal and adjusting the power consumption of the transceiver based upon the acceleration of the mobile terminal exceeding a predefined acceleration threshold level. The adjustment of the power consumption of the transceiver will entail altering the frequency at which the transceiver is activated. In this regard, the method may include the steps of reducing the power consumption of the transceiver when the predefined acceleration threshold level is not exceeded and/or increasing the power consumption of the transceiver when the predefined acceleration threshold is exceeded. These alternate steps may be further defined as reducing or increasing the frequency at which the area proximate the mobile terminal is interrogated by the transceiver when the acceleration of the mobile terminal exceeds or does not exceed the predefined acceleration threshold level.

In addition to apparatus and method embodiments the invention is also defined by computer program products that include a computer-readable storage medium having computer-readable program code portions stored therein. In one embodiment of the invention the computer-readable program code portions includes a first executable portion capable of determining a rate of motion provided to the mobile terminal and a second executable portion capable of activating the transceiver associated with the mobile terminal if the rate of motion exceeds a predefined threshold. In another embodiment of the invention the computer-readable program code portions includes a first executable portion capable of determining an acceleration of the mobile terminal; and a second executable portion capable of adjusting the power consumption of the transceiver based upon the determined acceleration of the mobile terminal exceeding a predefined acceleration threshold level. Further, adjusting the power consumption of the transceiver includes altering the frequency at which the transceiver reader is activated.

Thus, the method, terminal and computer program product of the present invention are capable of adjusting the power consumption of short-range communication transceivers, such as RFID, Bluetooth®, IR transceivers or the like based upon the determined acceleration that the mobile terminal experiences. The transceiver, therefore, uses less power because it is only activated by an intentional gesture by the user, which causes the acceleration of the device to exceed the predefined threshold. Due to the adjustment of power consumption, the present invention conserves power of the mobile terminals associated with transceivers, which permits the mobile terminals and transceiver to operate longer without requiring charging or replacement of the power supply as compared to mobile terminals associated with transceiver that do not use these techniques. As such, the present invention provides for an energy saving process that is easy to implement and intuitive to the user of the device, in that, the user can activate the transceivers, and optionally the related sensors, by providing an intentional gesture directed at the terminal and, optionally, receiving tactile feedback from the device that the transceivers have been successfully activated.

BRIEF DESCRIPTION OF THE DRAWINGS

Figure 1:
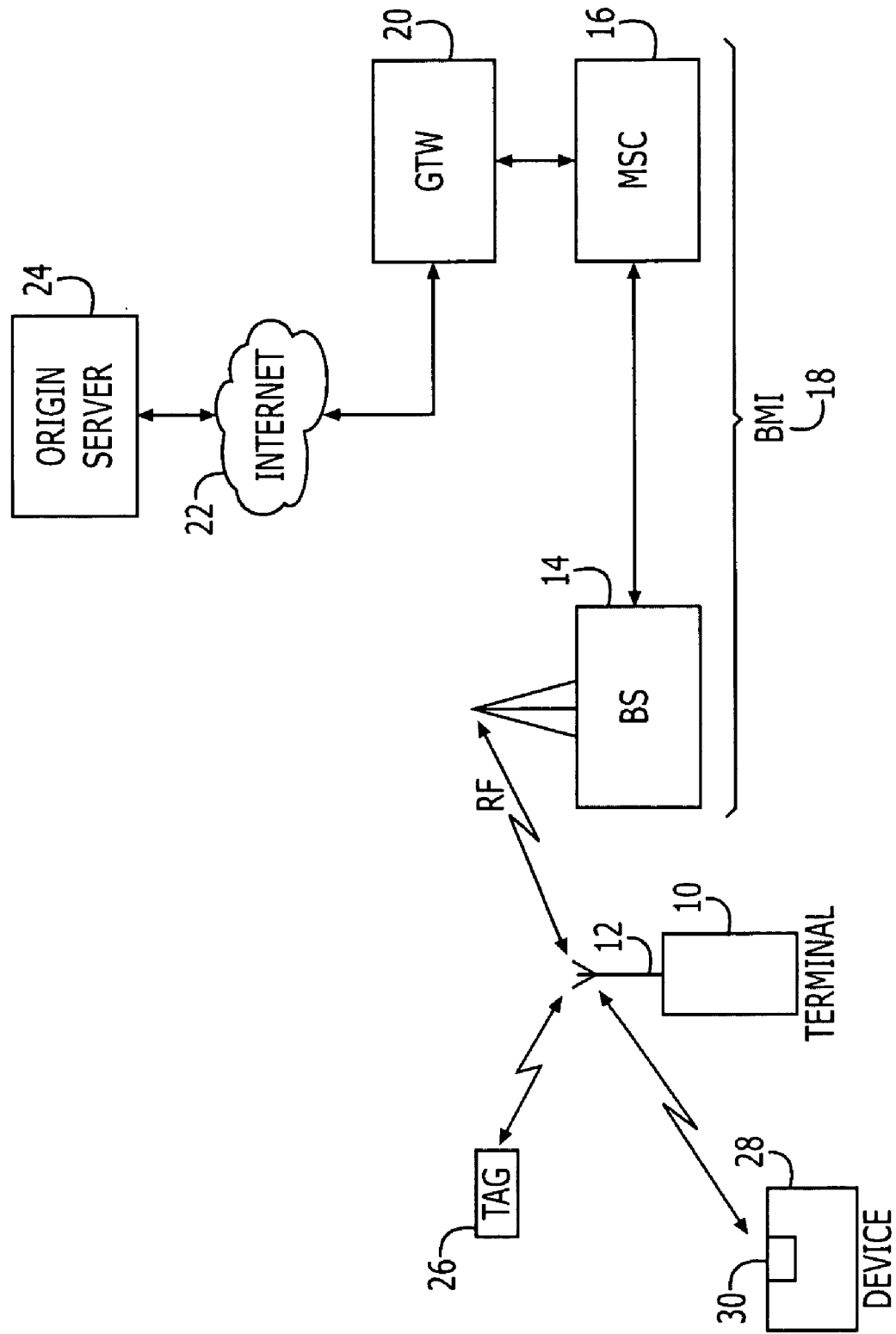
Figure 2:
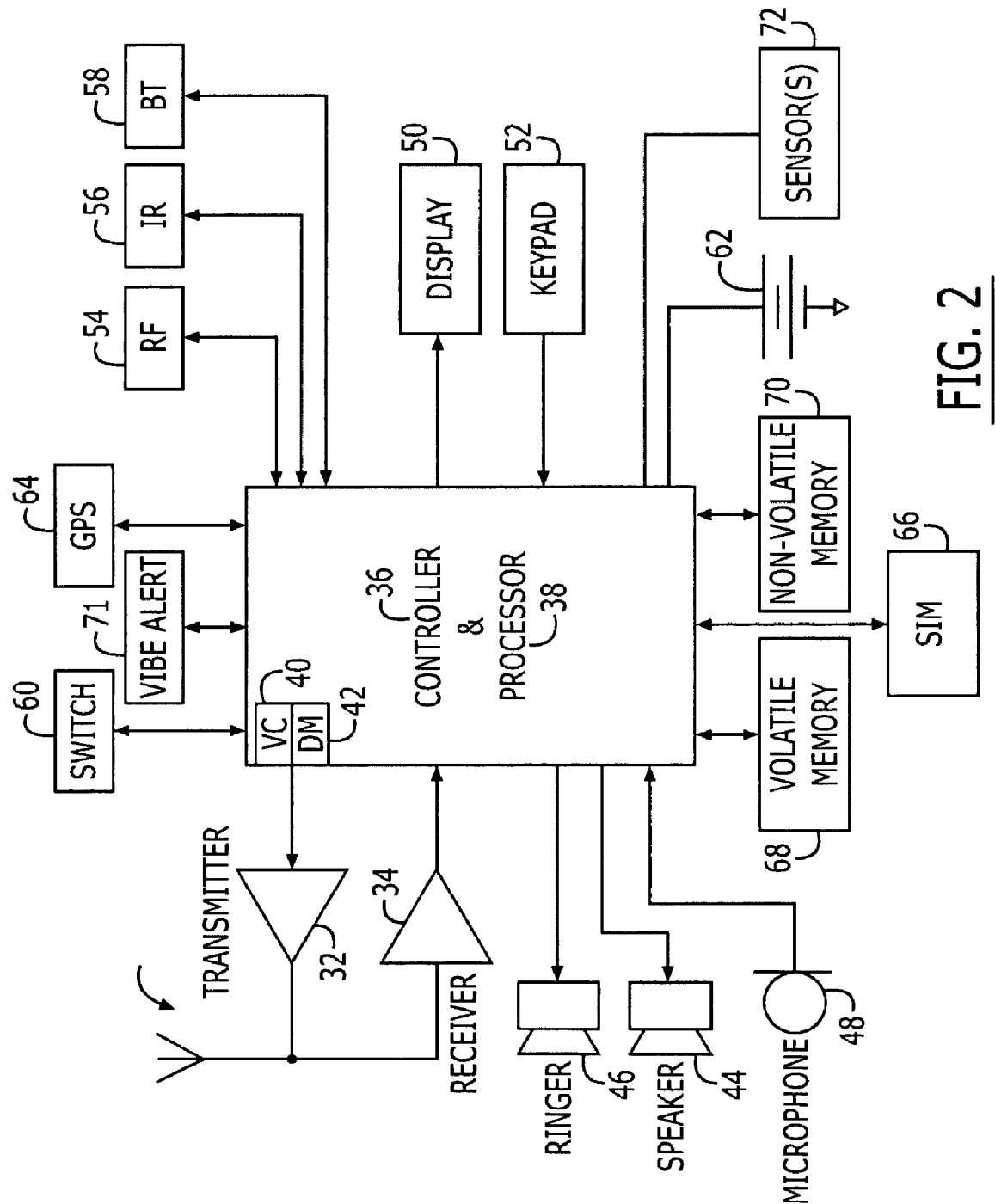
Figure 3:
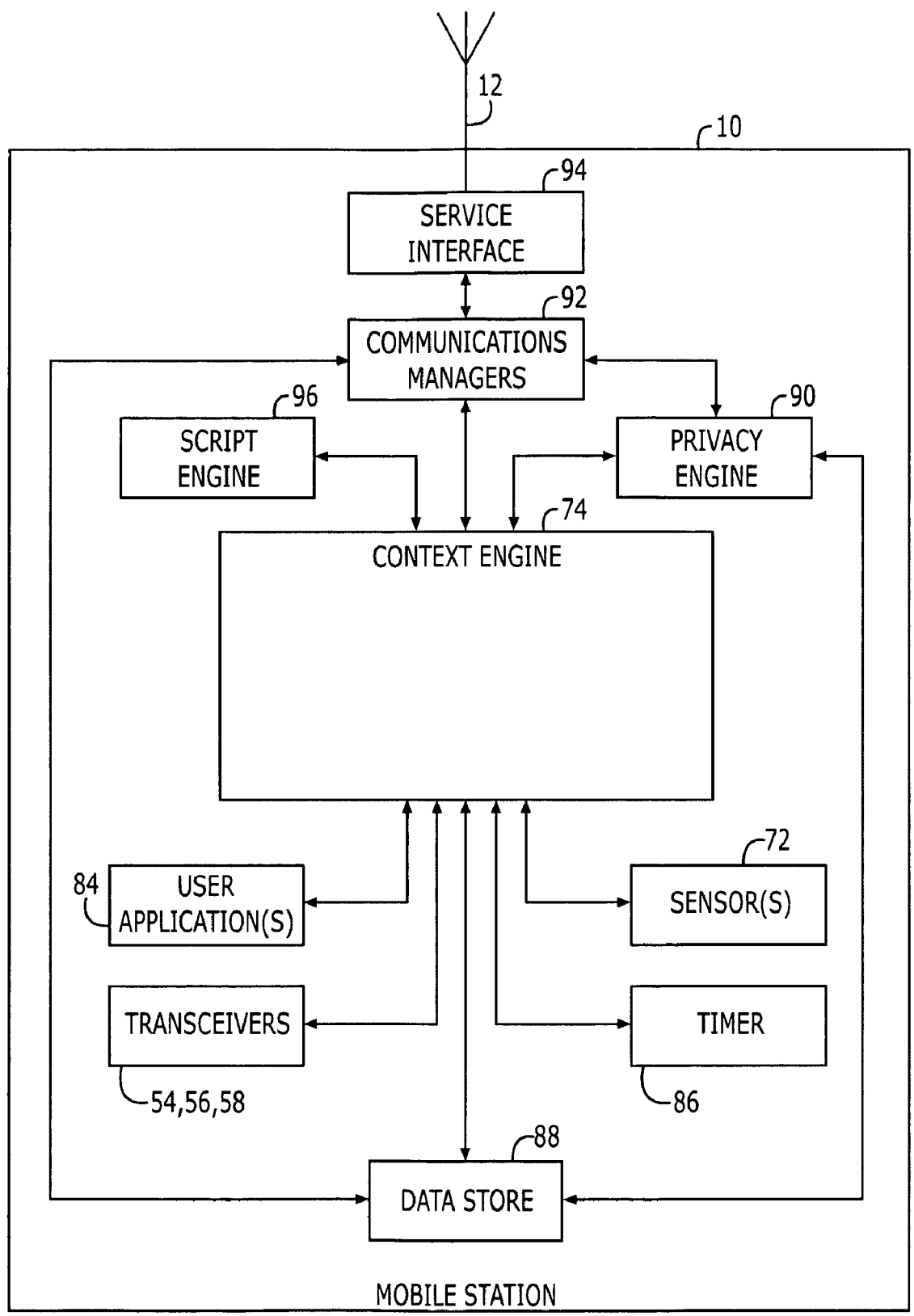
Figure 4:
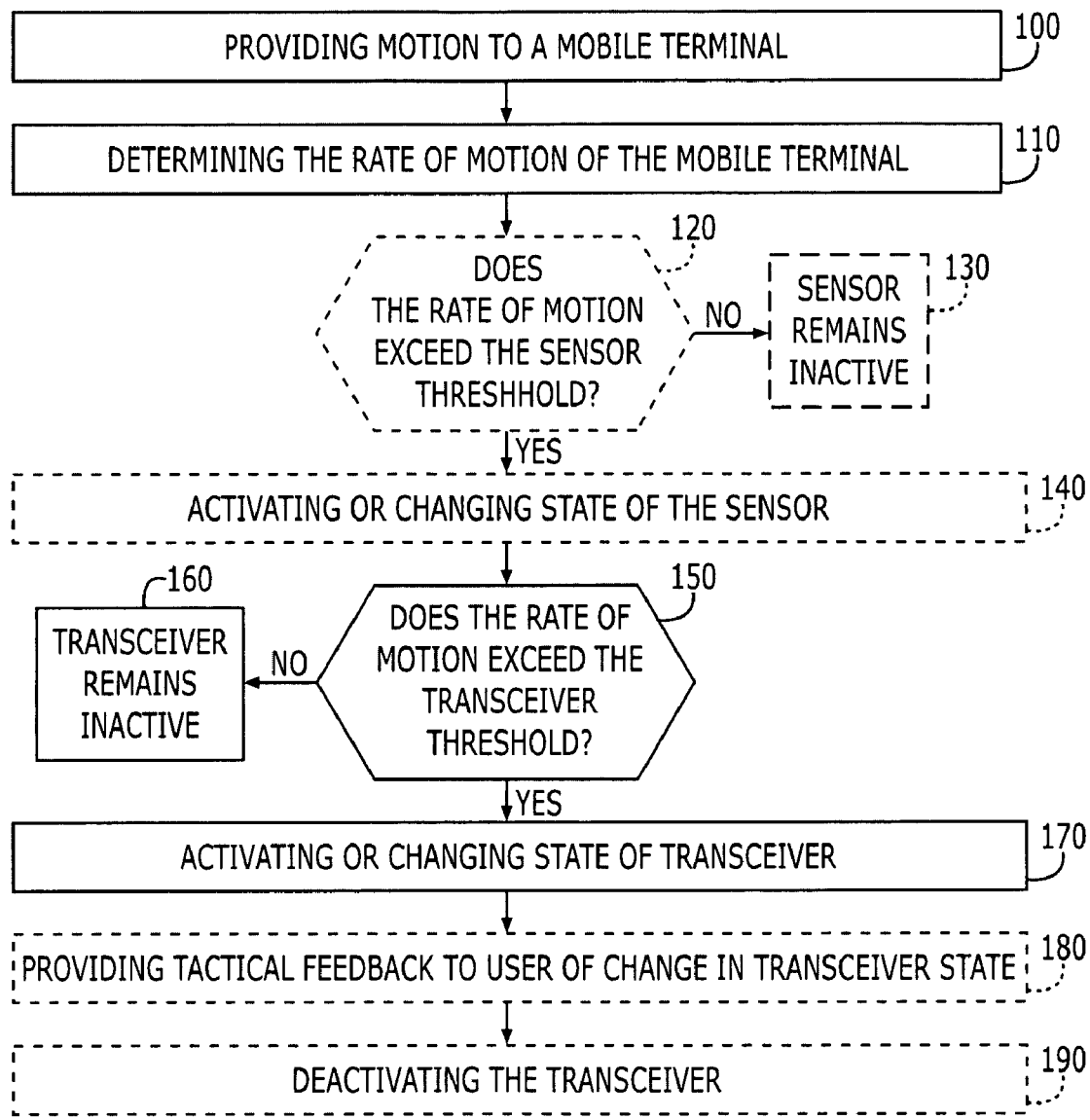
Figure 5:
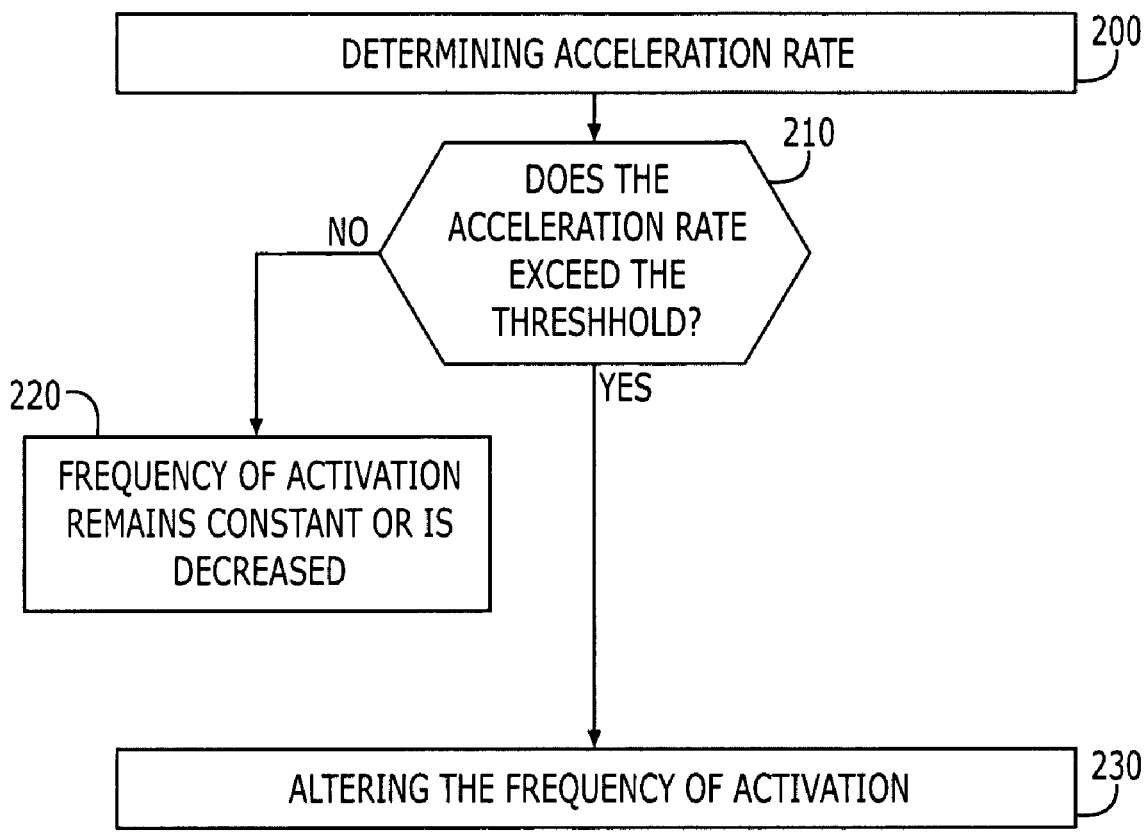

Having thus described the invention in general terms, reference will now be made to the accompanying drawings, which are not necessarily drawn to scale, and wherein:

FIG. 1 is a block diagram of a communications network that would benefit from embodiments of the present invention;

FIG. 2 is a schematic block diagram of a mobile terminal, in accordance with one embodiment of the present invention;

FIG. 3 is a schematic block diagram of context exchange architecture in a mobile terminal, in accordance with one embodiment of the present invention;

FIG. 4 is a flowchart illustrating various steps in a method for activating a short-range communication transceiver associated with a mobile terminal, in accordance with an embodiment of the present invention; and FIG. 5 is a flowchart illustrating various steps in a method for adjusting power consumption of a short-range communication transceiver associated with a mobile terminal, in accordance with one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention is defined by methods, terminals and computer programs that provide for greater conservation of power in mobile devices associated with short-range communication transceivers. In particular, the techniques for power conservation of the present invention implement motion recognition via the integration of motion sensors to detect a user gesture, such as tapping the device, shaking the device, or otherwise moving the device. Detection of the gesture by the device results in the device moving from an inactive, "sleep" mode to an active "awake" mode or vice-versa. By requiring the user to perform an intuitive gesturing function, the user has control over the active and non-active states, thus, insuring the transceiver is in an active state only in environments and situations that dictate such. By limiting the active state of the transceiver based on user discretion, energy management will be realized because the device will typically not be activated in situations that do not warrant activation.

Referring to FIG. 1, an illustration is provided of a communication network 100 that implements a mobile terminal having short-range communication capabilities. Such a mobile terminal will generally benefit from the embodiment of the present invention. As disclosed, the system, terminal and method embodiments of the present invention will be primarily described in conjunction with mobile communications applications. It should be understood, however, that the systems, terminals and methods of the present invention may be utilized in conjunction with a variety of other applications, both in the mobile communication environment and outside of the mobile communication environment. For example, the system, terminal and method of the present invention can be utilized in conjunction with wireline and/or wireless network applications.

Referring to FIG. 1, a terminal 10 may include an antenna 12 for transmitting signals to and for receiving signals from a base site or base station (BS) 14. The base station is a part of a cellular network that includes elements required to operate the network, such as a mobile switching center (MSC) 16. As is known by those of ordinary skill in the art of telecommunications, the cellular network may also be referred to as a Base Station, Mobile Switching Center and Interworking function (BMI) 18. In operation, the MSC is capable of routing calls and messages to and from the terminal when the terminal is making and receiving calls. The MSC also provides a connection to landline trunks when the terminal is involved in a call. Further, the MSC can, but need not, be coupled to a server GTW 20 (Gateway).

The MSC 16 can be coupled to a network, such as a local area network (LAN), a metropolitan area network (MAN), and/or a wide area network (WAN). The MSC can be coupled to the network directly, or if the system includes a GTW 20 (as shown), the MSC can be coupled to the network via the GTW. In one typical embodiment, for example, the MSC is coupled to the GTW, and the GTW is coupled to a WAN, such as the Internet 22. In turn, devices such as processing elements (e.g., personal computers, server computers or the like) can be coupled to the terminal 10 via the Internet. For example, the processing elements can include one or more processing elements associated with an origin server 24.

In addition to cellular network communication, the terminal 10 may be equipped to communicate with other devices via short-range communication techniques. In the FIG. 1 embodiment the terminal 10 is in wireless short-range communication with transponder 26 and device 28 equipped with internal short-range communication transceiver 30. As will be appreciated, the electronic devices and transponders can comprise any of a number of different known devices and transponders capable of transmitting and/or receiving data in accordance with any of a number of different short-range communication techniques. For example, the short-range communication technique may include RFID, Bluetooth®, infrared, IrDA (Infrared Data Association) or the like. The electronic device 28 may include any of a number of different devices, including other mobile terminals, and wireless accessories, portable digital assistants (PDAs), pagers, laptop computers and other types of electronic systems. Likewise, for example, the transponders can comprise Radio Frequency Identification (RFID) tags or the like.

Reference is now made to FIG. 2, a bock diagram, which illustrates one type of terminal 10, a mobile terminal associated with short-range communication that incorporates a motion sensing device, in accordance with an embodiment of the present invention. It should be understood, however, that the mobile terminal illustrated and hereinafter described is merely illustrative of one type of terminal that would benefit from the present invention and, therefore, should not be taken to limit the scope of the present invention. While several embodiments of the terminal are illustrated and will be hereinafter described for purposes of example, other types of terminals, such as portable digital assistants (PDAs), pagers, laptop computers and other types of electronic systems, can readily employ the present invention.

As shown, in addition to an antenna 12, the mobile terminal includes a transmitter 32, a receiver 34, a controller 36, and a processor 38 that provides signals to and receives signals from the transmitter and receiver, respectively. These signals include signaling information in accordance with the air interface standard of the applicable cellular system, and also user speech and/or user generated data. In this regard, the mobile terminal can be capable of operating with one or more air interface standards, communication protocols, modulation types, and access types. More particularly, the mobile terminal may be capable of operating in accordance with any of a number of first generation (1G), second generation (2G), 2.5G and/or third-generation (3G) communication protocols or the like. For example, the mobile terminal may be capable of operating in accordance with 2G wireless communication protocols IS-136 (TDMA), GSM, and IS-95 (CDMA). Some narrow-band AMPS (NAMPS), as well as TACS, mobile terminals may also benefit from the teaching of this invention, as should dual or higher mode telephones (e.g., digital/analog or TDMA/CDMA/analog telephones). In some embodiments of the mobile terminal, such as the depicted in FIG. 2, the processor 38 and the controller 36 will be configured as a single unitary device, while in other embodiments the processor and the controller may be stand-alone devices.

It is understood that the controller 36 includes the circuitry required for implementing the audio and logic functions of the mobile terminal. For example, the controller may be comprised of a Digital Signal Processor (DSP) device, a microprocessor device, various analog-to-digital converters, digital-to-analog converters, and other support circuits. The control and signal processing functions of the mobile terminal are allocated between these devices according to their respective capabilities. The controller may additionally include an internal voice coder (VC) 40, and may include an internal data modem (DM) 42. Further, the controller may include the functionally to operate one or more software programs, which may be stored in memory (described below). For example, the controller may be capable of operating a connectivity program, such as a conventional Web browser. The connectivity program may then allow the mobile terminal to transmit and receive Web content, such as according to the Hypertext Transfer Protocol (HTTP) and/or the Wireless Application Protocol (WAP), for example.

The mobile terminal also comprises a user interface including a conventional earphone or speaker 44, a ringer 46, a microphone 48, a display 50, and a user input interface, such as keypad 52, all of which are coupled to the controller 36. The user input interface, which allows the mobile terminal to receive data, can comprise any of a number of devices allowing the mobile terminal to receive data, such as a keypad 52, a touch display (not shown) or other input device. In embodiments including a keypad, the keypad includes the conventional numeric (0–9) and related keys (#, *), and other keys used for operating the mobile terminal. Although not shown, the mobile terminal can include a battery, such as a vibrating battery pack, for powering the various circuits that are required to operate the mobile terminal, as well as optionally providing mechanical vibration as a detectable output.

The mobile terminal will also include one or more means for sharing and/or obtaining data via short-range communication from electronic devices 28, transponder 26 or the like. As shown in FIG. 2, the mobile terminal can include a radio frequency (RF) transceiver 54 (which includes a RFID reader) so that data can be shared with and/or obtained from electronic devices 28 including other radio frequency transceivers, such as short-range communication transceiver 30 and/or transponders 26. In some embodiments of the mobile terminal of the present invention, the RF transceiver may be embodied in the processor 38, the controller 36 or the combined processor/controller. The mobile terminal can additionally, or alternatively, include other short-range communication transceivers, such as, for example, an infrared (IR) transceiver 56, and/or a Bluetooth® (BT) transceiver 58 operating using Bluetooth® brand wireless technology developed by the Bluetooth Special Interest Group. The RF transceiver 54 and/or other transceivers may be associated with the mobile terminal in any manner known to those skilled in the art. For example, in some embodiments, the RF transceiver 54 and/or other transceivers may be integrated in the mobile terminal or may be separate from, but in communication with, the mobile terminal, such as via any type of wireline and/or wireless techniques. The mobile terminal can therefore additionally or alternatively be capable of transmitting data to and/or receiving data from electronic devices and/or transponders. Although not shown, the mobile terminal may additionally or alternatively be capable of transmitting and/or receiving data from electronic devices and/or transponders according to a number of different wireless networking techniques, including, but not limited to, for example, WLAN techniques such as IEEE 802.11 techniques or the like.

The mobile terminal 10 also may include a switch 60 that is in communication with and under the control of the controller 36. As such, the switch 60 may be included in the controller 36 or separate from, but in communication with, the controller 36, such as via any type of wireline and/or wireless techniques known to those skilled in the art. In addition to other functions, the switch 60 may be capable of changing an operational mode of any of the transceivers 54, 56 and 58. For example, in one embodiment, the switch 60 may change the operational mode of one of transceivers 48 among a full-power active mode, one or more partial power modes and a low-power "sleep" mode. In other embodiments, the switch 60 may change the operational mode of any one of the transceivers among any other operational modes known to those skilled in the art.

The mobile terminal will typically also include a battery 62, such as a vibrating battery pack, for powering the various circuits that are required to operate the mobile terminal, as well as optionally providing mechanical vibration as a detectable output. For example, the battery 62 may provide, at least a portion of, the power required to operate any and all of the transceivers 54, 56 and 58. In addition, the mobile terminal may include a positioning sensor, such as a global positioning system (GPS) sensor 64. In this regard, the GPS sensor is capable of determining a location of the mobile terminal, such as longitudinal and latitudinal directions of the mobile terminal.

The mobile terminal can further include memory, such as a subscriber identity module (SIM) 66, a removable user identity module (R-UIM) or the like, which typically stores information elements related to a mobile subscriber. In addition to the SIM, the mobile terminal can include other removable and/or fixed memory. In this regard, the mobile terminal can include volatile memory 68, such as volatile Random Access Memory (RAM) including a cache area for the temporary storage of data. The mobile terminal can also include other non-volatile memory 70, which can be embedded and/or may be removable. The non-volatile memory can additionally or alternatively comprise an EEPROM, flash memory or the like. The memories can store any of a number of pieces of information, and data, used by the mobile terminal to implement the functions of the mobile terminal. The memories can also store one or more applications capable of operating on the mobile terminal.

The mobile terminal may also include one or more sensors 72. According to the present invention, included within the one or more sensors will be a sensor for detecting motion in the device, such as a low power acceleration sensor. The motion sensor will be configured to detect a predefined intentional user motion, i.e., user gesture, of the device to affect a change in the switch 60, which in turn affects the operational mode of a short-range transceiver, such as transceivers 54, 56 and/or 58.

The predefined user gesture may be some form of tapping or knocking of the device or some form of shaking of the device. In a handheld type mobile terminal, the tapping of the device may be preferred to minimize the overall user gesture and to allow for the transceiver within the device to be activated while concealed in a clothing pocket or otherwise concealed. Additionally, the motion sensor may be configured such that different forms of motion correlate to different transceiver operational modes or different quantities of motion, i.e., two taps as opposed to one tap, correlate to different transceiver operational modes. For example, shaking of the device may correspond to a longer transceiver activation mode as opposed to tapping of the device. Additionally, one tap of the device may correspond to a first transceiver activation mode while two taps correspond to a second, longer transceiver activation mode.

Additionally, it is possible for the motion sensor to be configured to sense the mobile device coming in contact with a transponder or a device equipped with a transponder. In this regard, the motion detector will recognize a "knocking" type movement of the device against the transponder or device equipped with a transponder and the "knocking" type gesture will trigger a change in the operational mode of the transceiver.

The motion or acceleration sensor 72 may additionally be configured with appropriate activation/deactivation logic, such that, the sensor changes operational mode (i.e., from a low-power mode to a high power and higher performance mode) if the sensor detects a minimal predefined acceleration, typically acceleration well below the acceleration required to trigger activation of the transceiver. Additionally, the sensor may be configured to change from an "off" state to an "on" state based upon the sensor detecting a predefined acceleration. By providing for power conserving features in the sensor, as well as the transceiver, the overall terminal benefits from even greater power conservation.

The measured and/or sensed data may then be utilized, such as by the processor 38, to determine a context and/or change in context of the mobile terminal. In regards, to the motion sensor, the change in context is defined as the change in the motion of the mobile terminal. The measured and/or sensed data may be transmitted according to one exemplary embodiment to a central blackboard that delegates the determined changes in the context to different destinations, such as the RFID transceiver 54, the Bluetooth® transceiver 56, or the infrared transceiver 58, utilizing a context exchange architecture. Alternatively, the sensed data may be transmitted and interpreted by any other suitable application capable of providing the necessary signal to switch 60.

Once the transceiver has been activated, the terminal may optionally be provided with a means for tactically notifying the user of the mobile terminal that the transceiver has been activated, deactivated or that the operational mode has been altered. The means for notifying the user may include vibration pulse feedback provided by an internal vibrating alert 71 the battery 62, audio feedback provided by the ringer 46 or speaker 44, visual feedback provided by the display 50, or any other suitable means for tactically providing feedback to the user.

In addition to the conventional mobile terminal discussed in relation to FIG. 2, the present invention may also be embodied in a dedicated motion-sensing and RFID reader mobile terminal, such as a key-ring appendage, a fob or the like. For the sake of brevity, the dedicated motion-sensing and RFID reader mobile terminal is herein referred to as the secondary mobile terminal. The secondary mobile terminal will communicate, via short-range wireless communication, with a corresponding primary mobile terminal, such as a cellular telephone, PDA or the like. The secondary mobile terminal is typically a device that is compact in size and readily available to the user. As such, the user can impart motion to the readily available secondary mobile terminal, which in turn can communicate tag-read information to the primary mobile terminal, which may be secured in a purse, a brief case or some other form of enclosure. Additionally, since the secondary mobile terminal is equipped with the RFID reader, the primary mobile terminal is not required to embody an RFID reader.

The secondary mobile terminal will include a RFID reader, a processor, an acceleration sensor and a short-range communication module, such as Bluetooth or WLAN module. In addition, secondary mobile terminal will typically include some form of battery to supply requisite power to the terminal. In addition, the secondary mobile terminal may include a memory component for temporal storing of tag-read information prior to subsequent communication of the information to the primary mobile terminal. In embodiments in which the secondary mobile terminal includes memory the user may be provided control over when the tag-read information is communicated to the primary mobile terminal.

In practice, the secondary mobile terminal may operate in the following manner. When a user desires to read information from an RFID tag and communicate this information to the primary mobile terminal, the user will provide motion, in the form of an intentional gesture, to the secondary mobile terminal. The motion provided to the secondary terminal will activate the RFID reader, which reads the tag information. After the secondary mobile terminal receives the information, the short-range communication module is activated. The short-range communication module is paired with a short-range communication module in the conventional mobile terminal, so that the information obtained by the dedicated motion-sensing device is transmitted over the short-range wireless link to the conventional mobile terminal. Once the conventional mobile terminal receives the information, it can either store the information or perform a task based on the information.

FIG. 3 illustrates context exchange architecture in a mobile terminal 10 to determine a context and/or change in context of the mobile terminal, in accordance with one embodiment of the present invention. The context exchange architecture provides for a means for implementing the motion sensors of the present invention. The implementation of the content exchange architecture should not be interpreted as limiting the present invention; other sensing interpretation means may also be implemented without departing from the inventive concepts herein disclosed. As shown in FIG. 3, the context exchange architecture of the mobile terminal 10 according to one embodiment of the present invention includes one or more sensors 72 that are capable of providing measured and/or sensed data, as described above. In accordance with the present invention, one or more sensors will include a motion sensor, such as an accelerometer. The sensors are further capable of preprocessing the measured and/or sensed data into "context atoms," such as by a sensor application program interface (API), and thereafter stored. As used herein, a "context atom" generally refers to a specific piece of context-related information. A context atom can comprise an entity that typically has an associated name, value, source (i.e., originator), date and/or any of a number of other attributes. More particularly, the context atom can include other attributes including metadata information, such as the reliability of the context-related information, as well as its accuracy, source, time of creation, etc. For example, a motion sensor can measure the acceleration of the mobile terminal 10, and thereafter process the acceleration information into a context atom. The context exchange architecture of the mobile terminal 10 also includes a context engine 74, which is capable of receiving, and thereafter storing, context atoms provided to the context engine from the various internal or external context sources, including the sensors 72 and the transceivers 54, 56 and 58. The timer 86 is in communication with the context engine and generally tracks the time between determinations of a change in context of the mobile terminal 10. In other embodiments of the mobile terminal 10, the timer 86 may be included in the context engine 74.

The context exchange architecture further includes a data store 88 coupled to the context engine 74. The data store is capable of storing information such as, for example, user preferences, profile information, as well as permissions for a privacy engine 90, also included within the architecture. The privacy engine is capable of providing security and privacy. More particularly, the privacy engine is capable of functioning on any of a number of different levels of security and privacy, from the lowest point of communication (e.g., a firewall) to the highest level (e.g., "who is my friend and who is not"). The user preferences and profiles in the data store, then, can control operation of the privacy engine. For example, the privacy engine can retrieve, from the data store, a list of known friends such that, when the mobile terminal 10 is queried for an action to be performed in accordance with embodiments of the present invention, the privacy engine can indicate whether the action is allowed by comparing the querying entity to the list of friends. In addition to the sources of context-related information within the mobile terminal 10 (e.g., sensors 72, transceivers 54, 56 and 58 and other data measuring elements), the context exchange architecture can provide for receiving context-related information from sources outside the mobile terminal. In this regard, the context exchange architecture includes a communications manager 92, which can identify other context sources located within a communication distance from the mobile terminal. In addition to identifying the other context sources, the communications manager can initiate contact with such context sources and, in general, provide housekeeping for communications with such context sources. The communications manager can also function as a firewall (along with the privacy engine 90). Advantageously, the communications manager can abstract different connection types to the context engine 74 such that context atoms within the context engine can be stored and/or retrieved regardless of whether the communications manager communicates with other context sources via Bluetooth®, GPRS, RFID, USB, or some other link type.

To facilitate the mobile terminal 10 communicating with the cellular network, data network and/or other electronic devices 28 (see FIG. 1), the context exchange architecture also includes a service interface 94. The service interface can comprise, for example, an over-the-air interface, as well as the underlying transport protocols (e.g., Ethernet, GPRS, TCP/IP). The context exchange architecture also provides a context exchange protocol. Generally, the context exchange protocol comprises a standardized protocol that allows different entities to exchange context atoms in a secure and reliable fashion, regardless of underlying architecture or transmission channel.

The context exchange architecture can additionally provide for creating new context atoms, as well as deleting and/or modifying existing context atoms. In this regard, the context exchange architecture can include a script engine 96, which can store rules and conditions. In one advantageous embodiment, the script engine is capable of receiving external rules according to the context exchange protocol, and thereafter storing the rules. The script engine can then examine the rules, subscribe to the relevant context atoms (described below), and then execute the rules according to conditions defined in the rules. The script engine allows complex rules to be executed for different events. As such, the script engine can reduce the need for application code, as well as reduce bandwidth requirements. The script engine can further specify requirements of the conditions to transmit a notification. For example, the script engine can specify conditions such as "transmit a notification only when the value change by more than 20%." In one embodiment, for example, the rules can comprise one or more Java classes that include executable code defining the conditions of the rules, and/or extensible markup language (XML) scripts that include Boolean logic defining the conditions of the rules.

Each context rule typically includes one or more conditions and one or more actions to be performed when the conditions are satisfied. In this regard, the conditions of the context rules are typically related to the context atoms, or more particularly, the values in the context atoms. The script engine 96 can execute any of a number of different context rules that include any of a number of different actions. Context rules can be exchanged between the mobile terminal 10 and other devices, such as electronic devices 28, in a number of different manners. In one embodiment, for example, context rules can be exchanged in accordance with the context exchange protocol, such as to add a new context rule, remove a context rule and/or notify a device of an expired or otherwise disabled context rule. Alternatively, context rules can be created internally within the mobile terminal.

The elements of the architecture have been described independent of the mobile terminal block diagram of FIG. 2. It should be understood, however, that the architecture of embodiments of the present invention, such as are illustrated in FIG. 3, are capable of being performed by a mobile terminal that includes the elements illustrated in FIG. 2. In this regard, at least a portion of the elements of the architecture are capable of being embodied in corresponding elements illustrated in FIG. 2. For example, the data store 88 is capable of being embodied in memory such as SIM 66, volatile memory 68 and/or non-volatile memory 70. Also, the functions of the context engine 74, script engine 96, privacy engine 90 and/or communications manager 92 are capable of being performed by controller 36 and/or processor 38. Additionally, or alternatively, one or more of the elements of the architecture of embodiments of the present invention can be performed by, and/or mirrored by, other elements of the cellular network and/or the data network of FIG. 1.

The mobile terminal 10 can receive measurements from any of a number of different types of local beacons capable of transmitting information such as, for example, a Bluetooth® enabled device and/or a RFID transponder. In this regard, when the local beacon comprises an RFID transceiver, the RFID transceiver 48 within the mobile terminal can receive the signal from the beacon by performing a service discovery to determine the RFID tag identifiers in the vicinity of the mobile terminal. The identifiers can then be stored by the blackboard as the context atoms "local RFID tag environment." Another application, referred to as a context consumer and described below, can then subscribe to the "local RFID tag environment," to thereby receive periodic updates of the measurements received by the RFID transceiver 48. In this regard, the mobile terminal can monitor the area proximate the mobile terminal for electronic devices, and request location information from them, if available. In the example given above, a RFID beacon can announce its location to a specific location, such as an auditorium, so that mobile terminal stores the context atom "location.logical=auditorium" in the blackboard.

In the preceding example the mobile terminal 10 stores a context atom identifying a logical location (i.e., an auditorium). It should be understood, however, context atoms can be created to identify any of a number of other types of locations, such as an exact location (e.g., GPS coordinates and/or addresses) and/or a relative location (e.g., "next to K-Mart"). The use of the GPS sensor 64 can be advantageous for providing location information, particularly when the mobile terminal is located outdoors. Even the absence of GPS location information can be useful, however, such as indicating a probability that the mobile terminal is located indoors, where the GPS sensor may not be able to detect location information.

In accordance with embodiments of the present invention, the terminal 10, such as via the communications manager 92 described above, is capable of reading a tag type from a transponder 26, and thereafter performing a predefined action based upon the tag type and a state of the terminal. Each tag can have any of a number of different tag types. For example, one or more tags can have the tag type, "Read Only," which designates the respective tag(s) as only being capable of transmitting data to the terminal during operation in accordance with the method of embodiments of the present invention. Also, for example, one or more tags can have the tag type, "Read/Write," which designates the respective tag(s) as being capable of transmitting data to and/or receiving data from the terminal during operation in accordance with the method of embodiments of the present invention. In addition, one or more transceivers 30 (e.g., one or more radio frequency transceivers) of one or more other electronic devices 28 may each be capable of operating as a tag during operation of the method of embodiments of the present invention. In such instances, each transceiver operating as a tag can have the tag type "Transceiver in Show Mode," which designates the respective transceiver as being capable of operating as a tag, typically having a "Read Only" tag type. It should be understood, however, that the tag type "Transceiver in Show Mode," can designate the respective transceiver as being capable of operating as a tag having a "Read/Write" tag type.

A typically RFID application operates in the following manner. An RFID transceiver associated with a mobile terminal interrogates an area proximate the mobile terminal during a service discovery to determine if any RFID tags are present in that area. If the RFID transceiver detects a transponder, then the RFID reader within the transceiver will typically read a tag identifier from the tag. If the RFID reader determines that it has read the tag during a previous interrogation based upon a comparison of the tag identifier to a list of tag identifiers stored by the mobile terminal and associated with those tags read during a previous interrogation, then it may not read the rest of the tag, thereby increasing the operational efficiency and decreasing the power consumption. If, however, the RFID reader determines that the tag has not been read during a previous interrogation, then the RFID reader will read the tag and perform any further function as described above. For example, the RFID reader may read the tag and determine that the mobile terminal should transmit certain data to and/or receive data from the RFID transceiver, if any, associated with the tag.

In addition, the processor 38 and/or user applications(s) 84 may also utilize the information received from the RFID transceiver, such as via the communications manager 92, to at least contribute to the determination of a context and/or change in context of the mobile terminal, as described above. For example, if the RFID transceiver detects the same group of RFID tags during a current interrogation that the RFID transceiver detected during a previous interrogation, then the processor 38 may utilize that information, alone or in conjunction with other measured and/or sensed data, such as data indicating the mobile terminal has not moved appreciably, to determine that the context of the mobile device has likely not changed. If, however, the RFID transceiver does identify any type of change in the RFID tags detected during an interrogation of the area proximate the mobile terminal as compared to a prior interrogation of the area proximate the mobile terminal, then the processor 38 may utilize that information, alone or in conjunction with other measured and/or sensed data, to determine that the context of the mobile device has changed.

Typically, the RFID reader associated with a mobile terminal interrogates the area proximate the mobile terminal for RFID tags on a periodic basis at a predefined interval, such as every 300 ms, which can consume a significant amount of power and drain the battery 62 much faster than in mobile terminals that are not associated with a RFID transceiver or other short-range communication transceivers. Thus, in accordance with embodiments of the present invention, the method, terminal and computer program product of the present invention utilizes the determination of the context and/or change in context, specifically the motion of the mobile terminal, to adjust the power consumption of a short-range communication transceiver and, therefore, reduce the power consumption of the short-range communication transceiver associated with a mobile terminal.

In an alternate embodiment of the invention, intuitive energy management of a mobile terminal may be provided by dedicating a keystroke to activate or change the power state of the transceivers associated with short-range communication. In such an embodiment, the dedicated key may provide for the transceivers to move from an "off" state or low-power state to an "on" state or a higher power state. Additionally, the dedicated key may provide for the transceivers to be altered in terms of activation frequency. The dedicated key may also provide for the transceivers to be deactivated.

FIG. 4 illustrates various steps in a method for activating a short-range communication transceiver associated with a mobile terminal. At step 100, the method is initiated by providing motion to a mobile terminal. The motion will typically come in the form of a user gesture, typically an intentional gesture, that sets the terminal in motion, such as a "tapping" of the terminal, a "shaking" of the terminal or some other form of user gesture. At step 110, the rate of motion provided to the mobile terminal is determined. Determining the rate of motion, i.e., the acceleration, will typically involve sensing the motion provided to the terminal with an appropriate sensing mechanism, such as a motion sensor and processing the motion sensed to determine the acceleration.

Optionally, at step 120, the method may include the step of determining whether the acceleration provided to the terminal exceeds a predetermined threshold for changing the state of the sensor. This predetermined threshold is significantly lower than the predetermined threshold associated with changing the state of the transceiver. Changing the state of the sensor may include a change from an "on" state to an "off" state or changing from a low power state to a higher power state. Thus, if a determination is made that acceleration does not exceed the predetermined threshold the, at step 130, the sensor will remain in an "off" state or a low power state. However, if the determination is made that the acceleration exceeds the predetermined threshold then, at step 140, the sensor will be powered to an "on" state or a higher power state. This optional step provides the mobile terminal with greater power saving capability.

At step 150, at determination is made whether the acceleration exceeds a predefined threshold for changing the state of the transceiver. If the acceleration rate does not exceed the threshold then, at step 160, no activation of the transceiver occurs, i.e., the transceiver remains in a sleep mode. Typically, this will be the case if the user provides no requested gesture to the terminal, i.e., the user does not set the terminal in motion or if the users gesture does not reach an allowable level for triggering the activation of the transceiver.

If the determination is made that the acceleration does exceed the threshold then, at step 170, the transceiver is activated or the activation frequency is altered, i.e., an interrogation process ensues whereby the transceiver sends signals to the general vicinity in attempt to ascertain transponders in the general vicinity. Optionally, at step 180, the method may include the step of tactically notifying the user of the mobile device that the state of the transceiver has been altered. The tacit notification may come in the form of vibration feedback, audio feedback, visual feedback or any other user-perceptible feedback.

The method may additionally include, optional step 190, which provides for deactivating the device after a predefined time period of interrogation or further altering the frequency of interrogation. The onset of the time period is typically defined by a point in time at which the acceleration was determined to exceed the threshold level.

FIG. 5 illustrates various steps in a method for adjusting the power consumption of a transceiver associated with a mobile terminal in accordance with an embodiment of the present invention. At step 200, the method is initiated by determining an acceleration rate of the mobile terminal. Acceleration of the terminal will be provided for by a user gesture, typically intentional, such as "tapping" the device, "shaking" the terminal or other wise providing movement to the terminal. A sensing mechanism, such as an acceleration sensor will sense the acceleration of the device and processing means will determine an acceleration rate. At step 210, a determination is made as to whether the determined acceleration rate exceeds a predefined threshold level. If the predefined threshold level has not been exceeded then, at step 220, the method does not adjust the frequency of activation and/or decreases the frequency of activation. In other words, if a user provides no motion to the device or if the motion provided does not exceed the predefined threshold, the activation frequency will remain constant or the activation frequency will decrease. For instance, if the transceiver frequency is every 300 ms, meaning an interrogation will occur once every 300 ms, this period may be decreased to once every 1000 ms if the terminal does not receive an acceleration signal exceeding the threshold within a prescribed time frame.

If the predefined threshold level has been exceeded then, at step 230, the method adjusts the power consumption of the transceiver by altering the frequency at which the transceiver is activated. For instance, if the transceiver interrogation frequency is every 1000 ms prior to the determination of acceleration in excess of the threshold level and the maximum transceiver interrogation frequency is every 300 ms, then the transceiver interrogation frequency may be increased to any frequency between 1000 ms and 300 ms (including 300 ms).

In this regard, FIGS. 4 and 5 provide for methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems that perform the specified functions or steps, or combinations of special purpose hardware and computer instructions.

Thus, the method, terminal and computer program product of the present invention are capable of adjusting the power consumption of a short-range communication transceiver that are associated with mobile terminals based upon the motion of the mobile terminal. The short-range communication transceiver, therefore, uses less power because active scanning by the transceiver(s) is only undertaken when the motion sensors detect an intentional gesture from the terminal user, such as tapping, knocking or shaking the terminal device. As such, other than when the mobile terminal has detected a motion that is associated with an active scanning state, the transceivers associated with mobile terminals operate at relatively low power levels. Due to the adjustment of power consumption by short-range transceivers, the present invention conserves power of the mobile terminals associated with transceivers, which permits the mobile terminals and the transceivers to operate longer without requiring charging or replacement of the power supply as compared to mobile terminals associated with transceivers that do not use these techniques.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the cope of the appended claims. Although specific terms are employed herein, they are used in a generic and descriptive sense only and not for purposes of limitation.

That which is claimed:

1. A mobile terminal apparatus, the apparatus comprising:
a short-range communication transceiver;
an acceleration sensor in communication with the transceiver that detects acceleration of the mobile terminal; and
a processor in communication with the sensor and the transceiver that determines if the acceleration of the mobile terminal exceeds a predefined threshold and, upon determination of an acceleration exceeding the predefined threshold, adjusts the power consumption of the transceiver by altering the activation frequency of the transceiver.

2. The apparatus of claim 1, wherein the short-range communication transceiver is further defined as a Radio Frequency Identification (RFID) transceiver.

3. The apparatus of claim 1, wherein the short-range communication transceiver is further defined as a Bluetooth transceiver.

4. The apparatus of claim 1, wherein the short-range communication transceiver is further defined as an Infrared (IR) transceiver.

5. The apparatus of claim 1, further comprising a switch in communication with the processor that adjusts the power consumption of the transceiver by changing an operational mode of the transceiver.

6. A method for activating a short-range communication transceiver associated with a mobile terminal, the method comprising the steps of:
detecting motion to a mobile terminal;
determining a rate of motion provided to the mobile terminal;
activating the transceiver associated with the mobile terminal if the rate of motion exceeds a predefined threshold; and
determining a frequency at which the transceiver is activated based upon the determined rate of motion.

7. The method of claim 6, wherein the step of detecting motion to a mobile terminal further comprises the step of detecting an intentional gesture to a mobile terminal to set the mobile terminal in motion in order to indicate a willingness to receive information through the transceiver.

8. The method of claim 6, wherein the step of providing an intentional gesture to a mobile terminal to set the mobile terminal in motion in order to indicate a willingness to receive information through the transceiver further comprises an intentional gesture chosen from the group consisting of tapping the terminal, shaking the terminal and knocking the terminal.

9. The method of claim 6, wherein the step of determining a rate of motion provided to the mobile terminal further comprises providing for an acceleration sensor associated with the mobile terminal that determines the rate of motion of the mobile terminal.

10. The method of claim 6, further comprising the step of deactivating the transceiver after a predefined time period.

11. The method of claim 6, further comprising the step of providing the mobile device sensory-perceptible feedback that the transceiver has been activated.

12. The method of claim 11, wherein the providing mobile device sensory-perceptible feedback that the transceiver has been activated, further comprises sensory-perceptible feedback chosen from the group consisting of tactile vibrational feedback, tactile force feedback, audio feedback and visual feedback.

13. A method for energy management in a mobile terminal, the method comprising the step of:
detecting motion of a mobile terminal;
determining a rate of motion provided to the mobile terminal;
altering the power state of a motion sensing device if the rate of motion exceeds a first predefined threshold; and
altering the power state of a short-range communication transceiver if the rate of motion exceeds a second predefined threshold.

14. The method of claim 13, wherein altering the power state of a short range communication transceiver if the rate of motion exceeds a second predefined threshold further comprises altering the frequency at which the transceiver is activated.

15. The method of claim 13, wherein the step of detecting motion of a mobile terminal further comprises the step of detecting an intentional gesture to a mobile terminal to set the mobile terminal in motion.

16. The method of claim 15, wherein the step of detecting an intentional gesture to a mobile terminal to set the mobile terminal in motion further comprises an intentional gesture chosen from the group consisting of tapping the terminal, shaking the terminal and knocking the terminal.

17. The method of claim 13, further comprising the step of providing the mobile device sensory-perceptible feedback that the power state of the transceiver has been altered.

18. The method of claim 17, wherein the step of providing the mobile device sensory-perceptible feedback that the power state of the transceiver has been altered, further comprises sensory-perceptible feedback chosen from the group consisting of tactile vibrational feedback, tactile force feedback, audio feedback and visual feedback.

19. A method for adjusting power consumption of a short-range communication transceiver associated with a mobile terminal, the method comprising the steps of:
determining an acceleration rate of the mobile terminal; and
adjusting the power consumption of the transceiver based upon the acceleration rate of the mobile terminal exceeding a predefined threshold, wherein adjusting the power consumption of the transceiver comprises altering the frequency at which the transceiver is activated.

20. The method of claim 19, wherein the step of adjusting the power consumption further comprises the step of reducing the power consumption of the transceiver when the predefined threshold is not exceeded.

21. The method of claim 20, wherein the step of reducing the power consumption of the transceiver further comprises reducing the frequency at which the area proximate the mobile terminal is interrogated by the transceiver when the acceleration rate of the mobile terminal does not exceed the predefined threshold.

22. The method of claim 19, wherein the step of adjusting the power consumption further comprises the step of increasing the power consumption of the transceiver when the predefined threshold is exceeded.

23. The method of claim 22, wherein the step of increasing the power consumption of the transceiver further comprises increasing the frequency at which the area proximate the mobile terminal is interrogated by the transceiver when the acceleration rate of the mobile terminal exceeds the predefined threshold.

24. The method of claim 22, wherein adjusting the power consumption of the transceiver comprises changing an operational mode of the transceiver.

25. A computer program product for activating a short-range communication transceiver associated with a mobile terminal, the computer program product comprising a computer-readable storage medium having computer-readable program code portions stored therein, the computer-readable program code portions comprising:
- a first executable portion capable of determining a rate of motion provided to the mobile terminal;
- a second executable portion capable of altering the power state of the transceiver associated with the mobile terminal if the rate of motion exceeds a first predefined threshold; and
- a third executable portion capable of determining a frequency at which the transceiver is activated based upon the determined rate of motion.

26. The computer program product of claim 25, further comprising a fourth executable portion capable of deactivating the transceiver after a predefined time period.

27. The computer program product of claim 25, further comprising a fourth executable portion for providing sensory-perceptible feedback via the mobile terminal when the power state of the transceiver has been altered.

28. A computer program product for activating a short-range communication transceiver associated with a mobile terminal, the computer program product comprising a computer-readable storage medium having computer-readable program code portions stored therein, the computer-readable program code portions comprising:
- a first executable portion capable of determining a rate of motion provided to the mobile terminal;
- a second executable portion capable of altering the power state of the transceiver associated with the mobile terminal if the rate of motion exceeds a first predefined threshold; and
- a third executable portion capable of altering the power state of a motion sensor associated with the mobile terminal if the rate of motion exceeds a first predefined threshold.

29. A computer program product for adjusting power consumption of a short-range communication transceiver associated with a mobile terminal, the computer program product comprising a computer-readable storage medium having computer-readable program code portions stored therein, the computer-readable program code portions comprising:
- a first executable portion capable of determining an acceleration of the mobile terminal; and
- a second executable portion capable of adjusting the power consumption of the transceiver based upon the determined acceleration of the mobile terminal exceeding a predefined acceleration threshold level, wherein adjusting the power consumption of the transceiver comprises altering the frequency at which a reader of the transceiver is activated.

30. The computer program product of claim 29, wherein said second executable portion is also capable of reducing the power consumption of the transceiver when the predefined acceleration threshold level is not exceeded.

31. The computer program product of claim 30, wherein said second executable portion is capable of reducing the power consumption of the transceiver by reducing the frequency at which the area proximate the mobile terminal is interrogated by the transceiver when the predefined acceleration threshold level is not exceeded.

32. The computer program product of claim 29, wherein said second executable portion is also capable of increasing the power consumption of the transceiver when the predefined acceleration threshold is exceeded.

33. The computer program product of claim 32, wherein said second executable portion is capable of increasing the power consumption of the transceiver by increasing the frequency at which the area proximate the mobile terminal is interrogated by the transceiver when the predefined acceleration threshold is exceeded.

34. The computer program product of claim 29, wherein said second executable portion is also capable of adjusting the power consumption of the transceiver by changing an operational mode of the transceiver.

35. A system for providing a mobile terminal short-range wireless communication; the system comprising:
- a secondary mobile terminal including,
  - a Radio Frequency Identification (REID) reader,
  - an acceleration sensor in communication with the reader that detects acceleration of the mobile terminal,
  - a processor in communication with the sensor and the reader that determines if the acceleration of the secondary mobile terminal exceeds a predefined threshold and provides activation to the reader upon determination of an acceleration exceeding the predefined threshold, and
  - a short-range wireless communication module that provides for communication of information read by the RFID reader; and
- a primary mobile terminal including a short-range communication module that is associated with the short-range communication module of the secondary mobile terminal, such that information read by the RFID reader of the secondary mobile terminal is communicated to the primary mobile terminal.

36. The system of claim 35, wherein the secondary mobile terminal is further defined as a key-ring appendage.

37. The system of claim 35, wherein the secondary mobile terminal is further defined as a fob.

38. The system of claim 35, wherein the primary mobile terminal is further defined as a mobile terminal chosen from the group consisting of a cellular telephone terminal, a Personal Digital Assistant (PDA) terminal, a portable computer terminal and a digital imaging terminal.

* * * * *